Nov. 24, 1964 P. S. BENGSTON 3,158,845

FREQUENCY COMPENSATING SYSTEM

Filed March 4, 1960 3 Sheets-Sheet 1

INVENTOR.
P. S. BENGSTON
BY
ATTYS.

INVENTOR.
P. S. BENGSTON
BY W. E. Dusenbery
R. P. Hodges
ATTYS

INVENTOR.
P. S. BENGSTON
BY
W. E. Quesenberry
O. E. Hodges
ATTYS.

United States Patent Office 3,158,845

Patented Nov. 24, 1964

3,158,845

FREQUENCY COMPENSATING SYSTEM

Phillip S. Bengston, Silver Spring, Md., assignor to the United States of America as represented by the Secretary of the Navy Filed Mar. 4, 1960, Ser. No. 12,876
16 Claims. (Cl. 340—174.1)
(Granted under Title 35, U.S. Code (1952), sec. 266)

The invention described herein may be manufactured and used by or for the Government of the United States of America for governmental purposes without the payment of any royalties thereon or therefor.

This invention relates to a system for discriminating frequency modulated signals recorded on magnetic tape and more particularly for eliminating wow and flutter introduced by the recorder playback apparatus.

This invention also relates to apparatus for obtaining a voltage indicative of the period of a signal.

In addition, this invention relates to a non-linear wave shaping circiut and more particularly to a hyperbolic generator.

Modern telemetering systems employ magnetic tape to store data in the form of frequency modulated signals. When the stored signals are played back, variations in the tape speed and length will cause inaccuracies in the detected signal because the frequency of the potential at the pickup heads will not be indicative of the frequency of the signal originally recorded. These variations are generally referred to as wow and flutter. In the past, several systems have been developed to compensate for wow and flutter. Examples of such apparatus are disclosed in U.S. Patent 2,840,800 issued June 24, 1958 to W. H. Chester, U.S. Patent 2,364,723 issued December 12, 1944 to E. W. Kellogg and the application of D. J. Torpy et al., Serial No. 738,582, filed May 28, 1958. The prior systems either were not sufficiently accurate since they did not have fast response or they utilized considerable, complex equipment. Fast response was not achieved because low pass filters were usually employed to average the signal values. Such filters are unable to respond to variations occurring from cycle to cycle but must rely on variations over a long period of time to produce an accurate indication of the average value of an applied signal.

The present invention obviates the disadvantages of the prior art since no filtering is employed. This is made possible because of the unique circuits employed to average a voltage over only one cycle and to measure the period of an applied potential.

In this novel system, reference and data signals are recorded on a magnetic tape. Any wow flutter introduced by the recording and playback equipment will appear on both signals when detected by the pickup heads. Each signal is converted into a series of pulses, one pulse being derived for each cycle. The pulses associated with the reference channel are fed into a reference sampler wherein a voltage is derived having an amplitude directly proportional to the period thereof. The output of the reference sampler is gated to a hyperbolic generator everytime a data signal pulse is produced. The average value of the voltage fed into this generator is inversely proportional to the frequency of the reference signal and directly proportional to the frequency of the data signal. The minimum voltage produced by the hyperbolic generator is indicative of the average voltage each cycle the pulse is produced. The minimum voltage produced by the generator is sampled and stored once each data signal cycle. The resulting output signal is commensurate with the original signal compensated for wow and flutter.

The unique hyperbolic generator consists of a plurality of exponential networks. Each of the networks has a different potential initially applied thereto which is stored.

After the applied potential is removed the stored voltages will decay exponentially so that at first only one of the networks will be discharging. After the voltage stored in the first network has been sufficiently reduced, the second network will start to decay and the process continues from one network to another. In this way, an output signal is derived that is directly proportional to the amplitude of the applied signal and inversely proportional to the frequency thereof.

The discriminator circuit developed for this use in this invention utilizes a pulse shaping circuit that produces a pair of pulses for every cycle of the applied input. One of the pulses actuates a sawtooth generator and the other pulse actuates a sampling circuit. The sampling circuit samples the sawtooth voltage when energized and stores the sampled voltage from one cycle to another. If the sawtooth voltage should exceed the voltage previously stored, the sampler will follow the increase.

An object of this invention is to provide a unique compensation system for eliminating wow and flutter in magnetic tape playback apparatus.

Another object of this invention is to provide a wow and flutter compensating system having fast unfiltered response.

A further object of this invention is to provide a unique wave shaping circuit.

An additional object of this invention is to provide a circuit to determine the period of a signal.

Other objects and many of the attendant advantages of this invention will be readily appreciated as the same becomes better understood by reference to the following detailed description when considered in connection with the accompanying drawings wherein.

Figure 1:
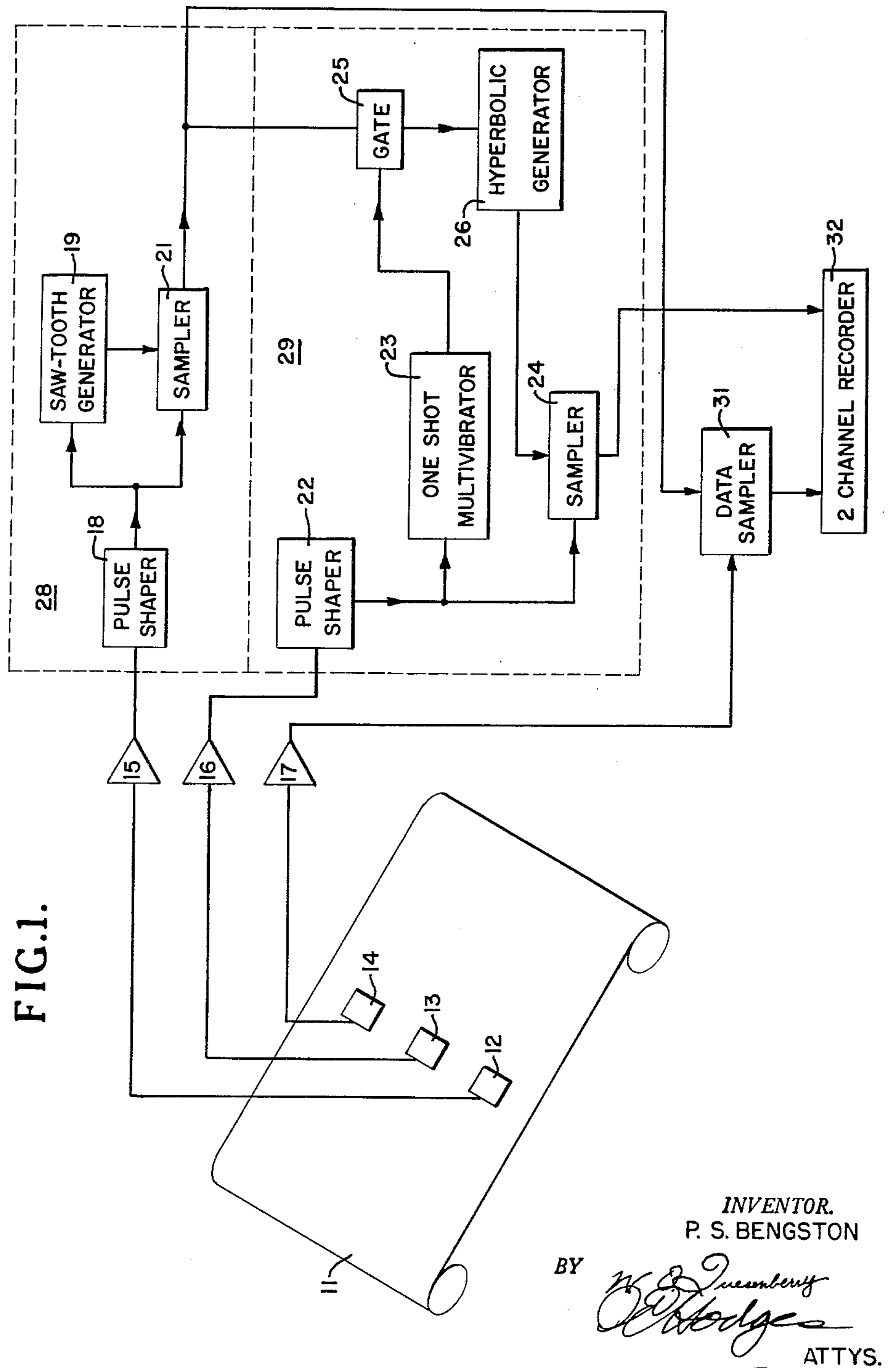
FIG. 1 is a block diagram of the system to compensate wow and flutter.

Referring now to the drawings, wherein like reference characters designate like or corresponding parts throughout the several views, there is shown in FIG. 1 a block diagram of the entire system. Three separate signal channels are recorded on tape 11 which are detected by pickup heads 12, 13 and 14. A reference signal of nominally constant frequency is picked up by head 12 while heads 13 and 14 pick up signals that are frequency modulated in accordance with data. The voltages on heads 12, 13 and 14 are fed to preamplifiers 15, 16 and 17, respectively, which produce rectangular waves in response thereto.

Figure 4A:
FIG. 4 illustrates voltage waveforms that appear in the circuits.
Figure 4B:
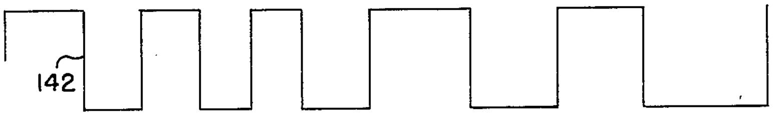
Figure 4C:
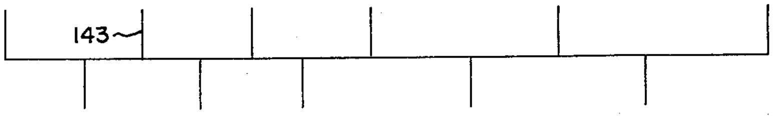
Figure 4D:
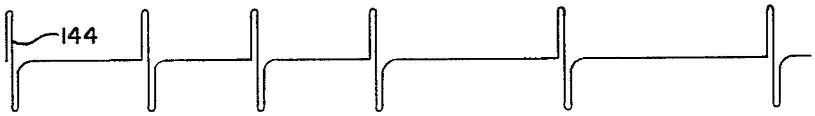
Figure 4E:
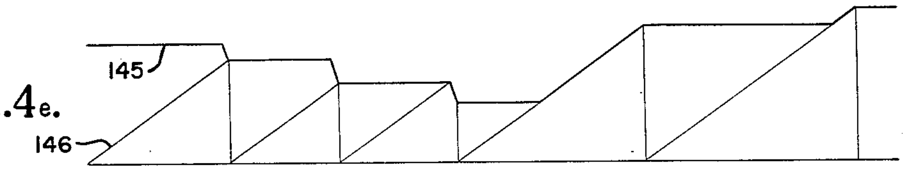

The output of 15, waveform 142 of FIG. 4*b*, is fed to reference sampler 28 which contains pulse shaper 18, sawtooth generator 19 and sampler 21. Shaper 18 generates positive and negative pulses, as shown by 144 in FIG. 4*d*, in response to the leading edge of waveshape 142. The negative pulses actuate sawtooth generator 19 and the positive pulses actuate sampler 21. The sawtooth voltage, FIG. 4*e* waveshape 146, is sampled every time sampler 21 is actuated and stored therein from one cycle to the next. If the sawtooth voltage exceeds the potential being stored in the sampler 21, it will follow the increased potential as shown in FIG. 4*e* at 145. The resulting output of the reference sampler 28 is fed in parallel to both data samplers 29 and 31.

The amplifiers 16 and 17 are connected to data samplers 29 and 31, respectively. Since the construction of both data samplers is identical, it is deemed necessary to only disclose the components in unit 29.

Figure 4F:
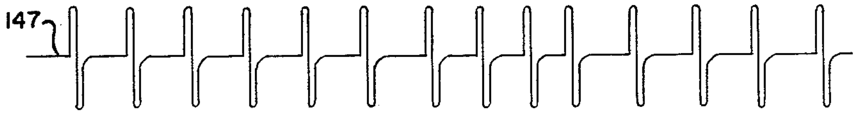

Pulse shaper 22 produces positive and negative pulses, FIG. 4*f*, in response to the square wave applied thereto. Since the data signals are of higher frequency than the reference signal, considerably more pulses will be generated by shaper 22 than by shaper 18. One shot multivibrator 23 produces a constant width pulse in response to the negative pulse applied thereto. The constant width pulse and the output of sampler 21 are combined in gate 25. The gate is opened when the constant width pulse is applied thereto permitting the potential developed by sampler 21 to be fed to hyperbolic generator 26 as shown by the waveform 148, in FIG. 4*g*. It can be shown that the average value of this waveform is directly proportional to the frequency of the data signal and inversely proportional to the frequency of the reference signal, i.e. directly proportional to the period of the reference signal. When the gate is closed the generator will produce a voltage that decreases from the output of sampler 21 inversely with respect to time. Generator 26 is connected to sampler 24 which is actuated by the positive pulses produced by shaper 22. The construction of sampler 24 is almost identical to that of sampler 21 so the minimum value of the hyperbolic signal is stored from one cycle of the data signal to the next. If the hyperbolic signal is less than the potential being stored in sampler 24, the voltage will be followed as shown in FIG. 41 by waveshape 151. The resulting output of the data sampler 29 is a signal varying in amplitude commensurate with the data signal and compensated for wow and flutter.

This can be shown as follows: The output of gate 25 is a pulse of constant width and variable amplitude illustrated in FIG. 4*g* as pulses 148. The amplitude is determined by the voltage produced by sampler 21 when multivibrator 23 is producing a pulse. The sampler 21 output is directly proportional to the period of the reference signal, i.e. $kT_R$ as shown by waveform 146 of FIG. 4*e*. Hyperbolic generator 26 produces an output curve that decreases inversely with time between the pulses applied thereto as illustrated by waveform 149 of FIG. 4*g*. The equation of this curve is given as $$\frac{E_1 t_1}{t}$$

where $E_1$ is the amplitude of the voltage applied to generator 26; $t_1$ is the width of the pulse produced by multivibrator 23; and $t$ is time as measured from the leading edge of the pulse 148. The output of generator 26 decreases inversely with time until the next pulse is initiated by multivibrator 23. The time between pulses produced by the multivibrator is equal to the period, $t_d$, [inversely proportional to frequency] of the data signals. Accordingly the minimum output produced by generator 26 is $$\frac{E_1 t_1}{t_d}$$

Since $E_1 = kT_R$ $$\frac{E_1 t_1}{t_d} = \frac{kT_R t_1}{t_d}$$

Thus, the voltage sampled by sampler 23 is compensated for like frequency changes appearing in the reference and data signals. It is also apparent that the output of sampler 24 is the average value of the pulse being fed into hyperbolic generator 26, i.e.

$$\frac{E_1 t_1}{t_d}$$

The data signal picked up by head 14 is fed to amplifier 17 and data sampler 31 where it is combined with the output of reference sampler 28. The compensated output of data samplers 29 and 31 are connected to any suitable read out apparatus such as two channel pen recorder 32.

Figures 2, 3:
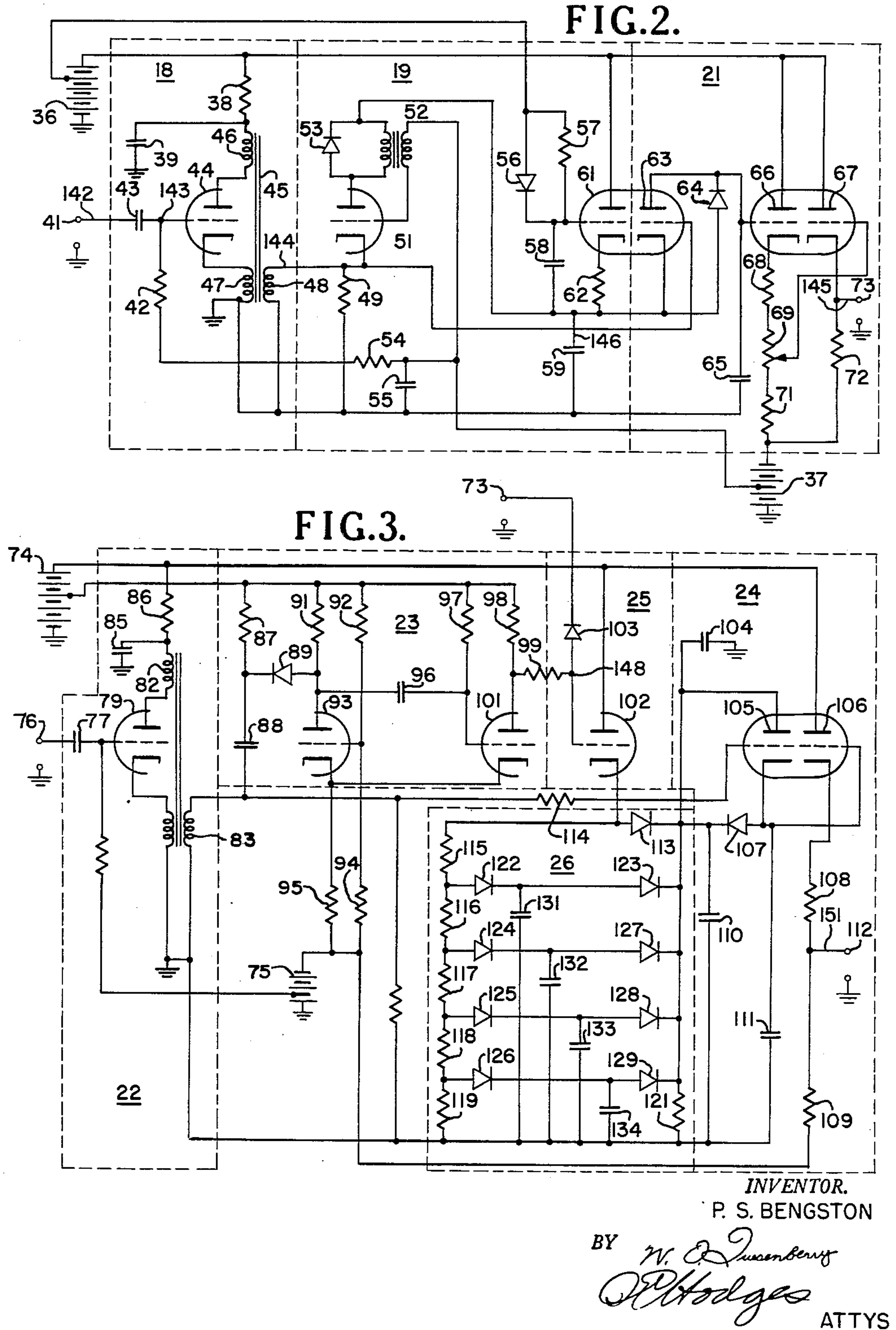
FIG. 2 is a circuit diagram of the reference sampler.
FIG. 3 is a circuit diagram of the data sampler.

Reference is now made to FIG. 2 wherein a detailed circuit diagram of reference sampler 28 is illustrated.

Pulse shaper 18 consists of a differentiator comprising capacitor 43 and resistor 42 connected to input terminal 41 and the grid of tube 44. The anode and cathode of tube 44 are connected to the windings 46 and 47, respectively, of transformer 45. Winding 46 is connected to battery 36 through resistor 38 and to ground through condenser 39. These components decouple the pulser from the other circuits. Tube 44 is normally maintained beyond cut-off since it is connected to battery 37 through resistors 42 and 54. Condenser 55 and resistor 54 prevent large variations in the potential of battery 37 when tube 44 is pulsed. Winding 48 of transformer 45 is connected to sawtooth generator 19 and sampler 21.

Sawtooth generator 19 contains a pair of triodes 51 and 61. The cathode of tube 51 is directly coupled to the secondary winding 48 and is connected to ground by way of resistor 49. Diode 53 and transformer 52 connect capacitor 59 to the anode of tube 51. Tube 51 is normally maintained beyond cutoff by battery 37 which is connected to the grid through transformer 52. Diode 53 prevents overshoot when tube 51 is pulsed. The anode of tube 61 is connected directly to battery 36 while the grid is connected to a tap on the battery by a biasing circuit composed of resistor 57 in parallel with diode 56. The grid and cathode of tube 61 are interconnected by capacitor 58 and resistor 62.

The voltage on capacitor 59 is coupled directly to sampler 21 which contains triodes 63, 66 and 67. The cathode of tube 63 is connected directly to capacitor 59. Diode 64 connects the anode and cathode of tube 63 together. The anode of this tube is also coupled to the grid of tube 66 and capacitor 65. The cathode of triode 66 is connected to battery 37 by resistor 68, potentiometer 69 and resistor 71 and the anode thereof is supplied by battery 36. The slider of potentiometer 69 is connected to the grid of triode 67. The cathode of this tube is connected to ground by way of resistor 72 and the anode is also energized by battery 36.

The operation of the reference sampler circuit will now be explained in detail. The rectangular waves 142 of FIG. 4*b* are obtained from the signal 141 of FIG. 4*a* picked up by head 12 of FIG. 1. The rectangular wave is applied to input terminal 41 where it is differentiated by condenser 43 and resistor 42, producing the spikes of FIG. 4*c*. Since tube 44 is biased beyond cut-off only the positive spikes will actuate it. The circuit associated with tube 44 is a triggered blocking oscillator which produces the wavetrain 144 of FIG. 4*d* across the secondary of transformer 48. The positive pulse of wavetrain 144 actuates tube 63 causing the charge stored on capacitor 59 to be transferred to capacitor 65, thus the voltage on capacitor 59 is sampled when the positive pulses are produced by shaper 18. The negative pulses of wavetrain 144 cause tube 51 to conduct, and discharge the voltage on capacitor 59. This capacitor is then charged up again as shown by wavetrain 146 of FIG. 4*e* by battery 36 connected thereto through capacitor 58, resistor 57 and diode 56. It is thus seen that tube 51 and capacitor 59 constitute a bootstrap integrator. When the voltage across capacitor 59 exceeds the voltage stored on capacitor 65, diode 64 will conduct causing the voltage across capacitor 65 to follow any increase that exceeds the value of the previously stored signal, as shown by waveform 145 in FIG. 4*e*. The signal across capacitor 65 is fed into cathode follower tubes 66 and 67. The slider position of potentiometer 69 determines the D.C. level of the output appearing at terminal 73. It is apparent from the foregoing that the voltage at terminal 73 will be directly proportional to the period of the signal applied to input terminal 41.

Reference is now made to FIG. 3 wherein a detailed circuit diagram of a data sampler is illustrated. Pulse shaper 22 is of identical configuration to pulse shaper 18, previously described and explained.

One shot multivibrator 23 comprises tubes 93 and 101. Secondary winding 83 is connected to the anode of tube 93 by way of condenser 88 and diode 89 and to the grid of tube 105 by resistor 114. The anode and grid of tube 93 are conected to battery 74 by resistors 91 and 92, respectively, while the resistors 94 and 95 connect the grid and cathode, respectively, of that tube to negative supply 75. Resistor 87 connects diode 89 and capacitor 88 to a tap on battery 74 to limit the current flow through tube 93. The anode of tube 93 is connected to the grid of tube 101 by condenser 96 and the cathodes of these tubes are connected together. The grid and anode of tube 101 are connected to the tap on battery 74 by resistors 97 and 98, respectively.

The output of the one shot multivibrator 23 is fed from the anode of tube 101 to gate 25 by resistor 99. The gate comprises diode 103 connected to the grid of tube 102. Diode 103 is also connected to terminal 73 which is the output terminal of the reference sampler. The cathode of tube 102 is directly connected to hyperbolic generator 26.

The hyperbolic generator or waveshaper contains a voltage divider having resistors 115–119 connected between the cathode of tube 102 and ground. Diode 113 connects the cathode of tube 102 to load resistor 121. The wave shaper comprises a plurality of networks made up of a pair of series connected diodes such as 122 and 123. Capacitors 131–134 are connected between the respective diodes and ground. Each of the networks is connected to a tap on the voltage divider, i.e. between adjacent resistors thereof and resistor 121.

The sampling circuit 24 contains capacitors 104 and 110 which are connected in parallel with resistor 121 and are also connected to the anode of tube 105. Diode 107 is connected to the cathode of tube 105 which is also connected to storage capacitor 111. The cathode of triode 105 is connected directly to the grid of tube 106. The output of the data sampler is taken between cathode resistors 108 and 109 at terminal 112.

The operation of the data sampler 24 will now be explained in detail. Square waves obtained from the data signal are applied to terminal 76 of shaper 22 which produces wave train 147 of FIG. 4*f*. It is noted that the pulses of FIG. 4*f* are similar to those of FIG. 4*d*. The number of pulses in the former is greater than the number in the latter because the frequency of the data signal is greater than the frequency of the reference signal. Of course, it is understood that wave shapes of the same type as shown in FIGS. 4*a–c* are associated with the wavetrain of FIG. 4*f* since the apparatus to produce that wavetrain is like that to produce the wavetrain of FIG. 4*d*. The positive pulse produced by shaper 22 renders tube 105 conductive so that charge stored on capacitors 104 and 110 is transferred to capacitor 111. The negative pulse produced by sampler 22 is coupled to the anode of triode 93 and the grid of triode 101 and causes tube 101 to cut-off the tube 93 to conduct heavily. Of course, it is understood that positive pulse will not effect tubes 93 and 101. Tube 93 will continue to conduct after the pulse has subsided and will remain conducting until the voltage on the grid of tube 101 has risen sufficiently to render that tube conductive. When tube 101 is conducting a constant voltage is applied to the grid of triode 102. When the pulse is produced the anode voltage of tube 101 is increased to the potential of the tap on battery 74. This increase in voltage limits the input of tube 102 to the voltage on terminal 73. Thus the output of the reference sampler is gated through tube 102 to the hyperbolic generator 26.

The pulse output of triode 102 is applied to capacitors 131–134 through diodes 122–126, respectively. Because of the voltage divider composed of resistors 115–119 the largest voltage is applied to capacitor 131 and successively smaller voltages are applied to the other capacitors and stored by them. When the pulse is removed capacitor 131 will begin to discharge through diode 123 and resistor 121. Initially the other capacitors will not discharge because the voltage on the anodes of diodes 127–129 will be greater than on the cathodes thereto, i.e. equal to the voltage across capacitor 131. As the voltage across 131 decreases it will become equal to that stored on capacitor 132 and diode 127 will be rendered conductive. This operation continues for the networks associated with capacitors 133 and 134 so that the output on load resistor 121 is a hyperbolic function, i.e. the voltage decreases inversely with time. Of course it is understood that any other suitable function can be obtained by the use of this type of network by properly choosing the component values. Also, the accuracy of such a generator increases with the number of networks employed.

Figure 4G:
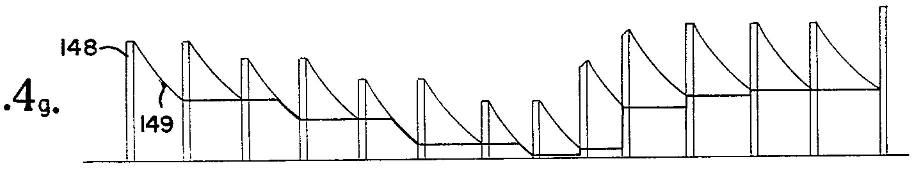
Figure 4H:
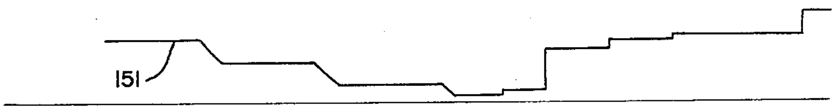

The output of hyperbolic generator, FIG. 4*g*, waveform 149 is fed to sampler 24. The construction and functioning of sampler 24 is similar to that of sampler 21. However, since a decreasing voltage is applied to sampler 24 the plate capacitor thereof is connected to the input and the storage or output capacitor is connected to the cathode of triode 105. When the voltage across capacitors 104 and 110 becomes less than the potential stored on capacitor 111, diode 107 conducts causing the potential across capacitor 11 to follow any decrease that is less than the value of the previously stored signal, as shown by waveform 151 in FIG. 4*h*. The voltage on the cathode of triode 105 is fed into cathode follower 106 resulting in a direct voltage varying in amplitude in accordance with the frequency of the data signal and compensated for wow and flutter introduced by the recording equipment.

Obviously many modifications of the present invention are possible in the light of the above teachings. It is understood that any desired number of channels can be recorded on tape 11. When the number of channels is altered, the corresponding number of data samplers and a pen recorder having the appropriate number of output channels must be employed. If desired, one of the data channels may also contain a timing signal. Of course the batteries may be replaced by any suitable power supply.

It should be understood, of course, that the foregoing disclosure relates to only a preferred embodiment of the invention and that numerous modifications or alterations of the invention may be made without departing from the spirit and scope of the invention as set forth in the appended claims.

What is claimed as new and desired to be secured by Letters Patent of the United States is:

1. A frequency compensating system comprising first means adapted to produce a first output signal varying in amplitude in accordance with the frequency of a first input signal, second means to produce pulses indicative of the frequency of a second input signal, third means coupled to said first and second means to combine the first output signal with the pulses to form a combined signal, and fourth means coupled to said third means to average the combined signal over a single cycle, whereby the output of said fourth means is a signal wherein like frequency components appearing in the first and second input signals are compensated.

2. The system of claim 1 wherein said third means comprises means to cause the signal developed by said first means to be fed to said fourth means only when a pulse is produced by said second means.

3. A system for compensating frequency variations in tape recorded frequency modulated signals caused by recording playback systems comprising a magnetic tape having a plurality of signal channels recorded thereon, a first of said channels being a frequency modulated data signal, a second of said channels being a reference signal, first and second detecting means connected respectively to said first and second said channels to separately detect each of the signals, first means having a first input coupled to said first detecting means to produce a first output signal varying in amplitude in accordance with the frequency thereof, second means coupled to said second detecting means to produce pulses indicative of the frequency thereof, third means coupled to said first and second means to combine the first output signal with the pulses thus forming a combined signal, and fourth means coupled to said third means to average the combined signal over a single cycle thereof, whereby the output of said fourth means is a signal wherein wow and flutter introduced by the playback system is compensated.

4. The system of claim 3 wherein said third means comprises means to cause the signal developed by said first means to be fed to said fourth means only when a pulse is produced by said second means.

5. The system of claim 3 wherein said first means is coupled to the detector means associated with said reference signal channel and said second means is coupled to the detector means associated with said data signal channel.

6. A system for compensating frequency variations in tape recorded signals caused by recording playback systems comprising, a first means coupled to a nominally constant frequency reference signal having wow and flutter interposed thereon to produce a first signal varying in amplitude in accordance with the frequency thereof, a plurality of second means each coupled respectively to a plurality of second signals having wow and flutter interposed thereon to produce pulses indicative of the frequency thereof, a plurality of third means coupled to said first means and each coupled respectively to said second means for gating the first signal when a pulse is produced by said second means, and a plurality of fourth means each respectively coupled to said third means to average the output thereof over a single cycle, whereby the wow and flutter interposed on the second signals are eliminated.

7. The apparatus of claim 6 further comprising a multichannel pin recorder, each channel of said recorder being respectively connected to the output of one of said fourth means.

8. A frequency compensating system comprising a first means responsive to a pair of input signals for producing an output consisting of a series of pulses, the average value of each cycle of the output being directly proportional to the frequency of one of the input signals and inversely proportional to the frequency of the other input signal, means connected to said first means to average the output thereof over each cycle, whereby the output of said averaging means is a signal wherein like frequency components appearing in the input signals are compensated.

9. A system for compensating frequency variations in tape recorded frequency modulated signals caused by recording playback systems comprising a magnetic tape having a plurality of signal channels recorded thereon, one of said channels being a frequency modulated data signal, another of said channels being a reference signal, first detecting means to pick up the signals on said one channel, second detecting means to pick up the signals on said other channel, first means coupled to said first detecting means to produce pulses indicative of the frequency of the signal detected thereby, second means coupled to said second detecting means to produce a voltage directly proportional to the period of the signal detected thereby, gate means coupled to said first and second means to cause the voltage produced by said second means to be passed when a pulse is produced by said first means, third means coupled to said gate means to average the output of said gate means over a single cycle, whereby the output of said third means is a signal wherein wow and flutter introduced by the playback system is compensated.

10. The system of claim 9 wherein said second means comprises a pulse shaping means to produce short duration positive and negative pulses for every cycle of the signal detected by said second detecting means, a pulse of one polarity occurring immediately after the pulse of the other polarity, generator means connected to said shaping means to initiate a saw-tooth voltage in response to the pulse of said one polarity, and means connected to said shaping means and to said generator means for sampling the saw-tooth voltage when the pulse of the other polarity occurs.

11. The system of claim 10 wherein said sampling means comprises a vacuum tube having a grid connected to said shaping means and a cathode connected to said generator means, a diode connected between the cathode and anode of said tube, a first capacitor having one side connected to the cathode of said tube, and a second capacitor connected between the anode of said tube and the other side of said first capacitor.

12. The system of claim 9 wherein said first means comprises a pulse shaping means connected to said first detecting means to produce short duration positive and negative pulses for every cycle of the signal detected by said first detecting means, a pulse of one polarity occurring immediately after each pulse of the other polarity, a one shot multivibrator connected to said shaping means to produce a pulse of predetermined width in response to a pulse of one polarity, gate means connected to said multivibrator and to said second means to effect passage of the voltage produced thereby only when a pulse is developed by said multivibrator, a hyperbolic generator connected to said gate means, means connected to said shaping means and to said generator for sampling the output thereof when the pulse of the other polarity is produced.

13. The system of claim 12 wherein said sampling means comprises a vacuum tube having a grid connected to said shaping means and a cathode connected to said generator means, a diode connected between the cathode and anode of said tube, a first capacitor having one side connected to the cathode of said tube, and a second capacitor connected between the anode of said tube and the other side of said first capacitor.

14. The system of claim 12 wherein said generator comprises common, input and output terminals, a voltage divider having a plurality of taps connected between said input and common terminals, a diode connected between said input and said output terminals, a pair of series connected diodes connected between each of said taps and said output terminal and a capacitor connected between said pair of diodes and said common terminal.

15. A frequency compensating system comprising first means adapted to produce a first output signal varying in amplitude in accordance with the frequency of a first input signal, second means to produce pulses indicative of the frequency of a second input signal, third means coupled to said first and second means to allow the first output signal to be passed when a pulse is produced by said second means, and hyperbolic generator means coupled to said third means to produce a hyperbolic signal in response to the output thereof, whereby the minimum value of the hyperbolic signal is compensated to the value of one of the input signals.

16. A system for compensating frequency variations in tape recorded frequency modulated signals caused by recording playback systems comprising a magnetic tape having a plurality of signal channels recorded thereon, one of said channels being a frequency modulated data signal, another of said channels being a reference signal, first detecting means to pick up the signals on said one channel, second detecting means to pick up the signals on said other channel, first means coupled to said first detecting means to produce pulses indicative of the frequency of the signal detected thereby, second means coupled to said second detecting means to produce a voltage directly proportional to the period of the signal detected thereby, gate means coupled to said first and second means to cause the voltage produced by said second means to be passed when a pulse is produced by said first means, and hyperbolic generator means coupled to said gate means to produce a hyperbolic voltage in response to the output thereof, whereby the minimum value of the hyperbolic voltage is compensated to the value of one of the input signals.

References Cited by the Examiner

UNITED STATES PATENTS

| | | | |
|---|---|---|---|
| 2,467,777 | 4/49 | Rajchman et al. | 328—40 |
| 2,482,803 | 9/49 | Smith et al. | 328—21 |
| 2,486,154 | 10/49 | Hadfield | 329—140 |
| 2,498,900 | 2/50 | Schoenfeld | 328—21 |
| 2,685,079 | 7/54 | Hoeppner | 179—100.2 X |
| 2,713,677 | 7/55 | Scott et al. | 340—174.1 |
| 2,840,800 | 6/58 | Chester | 340—174.1 |
| 2,951,243 | 8/60 | Torpy et al. | 340—174.1 |

I. L. SRAGOW, *Primary Examiner.*